United States Patent
Mei et al.

(10) Patent No.: US 7,579,298 B2
(45) Date of Patent: Aug. 25, 2009

(54) CATALYST, ELECTRODE FOR FUEL ELECTRODE IN FUEL CELL, AND FUEL CELL

(75) Inventors: Wu Mei, Yokohama (JP); Taishi Fukazawa, Fuchu (JP); Takahiro Sato, Kawasaki (JP); Yoshihiko Nakano, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 270 days.

(21) Appl. No.: 11/534,804

(22) Filed: Sep. 25, 2006

(65) Prior Publication Data

US 2007/0087258 A1 Apr. 19, 2007

(30) Foreign Application Priority Data

Oct. 18, 2005 (JP) ............... P2005-302813

(51) Int. Cl.
B01J 23/42 (2006.01)
B01J 23/44 (2006.01)
B01J 23/00 (2006.01)
H01M 4/92 (2006.01)

(52) U.S. Cl. ............ 502/339; 502/325; 429/40
(58) Field of Classification Search ............. 502/325, 502/339; 429/40
See application file for complete search history.

(56) References Cited

U.S. PATENT DOCUMENTS

2003/0187283 A1* 10/2003 Jansen et al. ............... 549/523

2007/0254806 A1* 11/2007 Mei et al. ................... 502/325

FOREIGN PATENT DOCUMENTS

| CN | 1649669 | 8/2005 |
| JP | 7-246336 | 9/1995 |
| JP | 07-246336 A | * 9/1995 |
| JP | 2004-281177 | 10/2004 |

OTHER PUBLICATIONS

U.S. Appl. No. 12/121,282, filed May 15, 2008, Fukuzawa et al.
U.S. Appl. No. 11/737,393, filed Apr. 19, 2007, Mei et al.
U.S. Appl. No. 11/863,798, filed Sep. 28, 2007, Mei et al.
U.S. Appl. No. 11/863,856, filed Sep. 28, 2007, Mei et al.
Taeyoon Kim, et al., "Methanol Electrooxidation on Carbon-Supported $Pt_3Ru_2Sn$ Ternary Catalyst", Chemistry Letters, vol. 33, No. 4, 2004, pp. 478-479.
A. Lima, et al., "Investigation of Ternary Catalysts for Methanol Electrooxidation", Journal of Applied Electrochemistry, vol. 31, 2001, pp. 379-386.

* cited by examiner

*Primary Examiner*—Timothy C Vanoy
*Assistant Examiner*—Daniel Berns
(74) *Attorney, Agent, or Firm*—Oblon, Spivak, McClelland, Maier & Neustadt, P.C.

(57) ABSTRACT

Catalysts contain noble metal-containing particles that has a composition except oxygen represented by a formula $Pt_xRu_yA_zSn_S$ and exhibits a mean particle diameter of from 0.5 nm to 10 nm, both inclusively. A is at least one element selected from a group consisting of Rh, Au, Pd, Ir and Os, and X, Y, Z and S are atomic ratios satisfying relations $30 \leq X \leq 70$, $30 \leq Y \leq 70$, $0 \leq Z \leq 40$, $0.5 \leq S \leq 8$ and $X+Y+Z+S=100$.

9 Claims, 2 Drawing Sheets

CATALYST, ELECTRODE FOR FUEL ELECTRODE IN FUEL CELL, AND FUEL CELL

CROSS REFERENCE TO RELATED APPLICATIONS

The present application is based upon and claims the benefit of priority from the prior Japanese Patent Application No.2005-302813, filed on Oct. 18, 2005; the entire contents of which are incorporated herein by reference.

BACKGROUND OF THE INVENTION

1. Field of the Invention

The present invention relates to catalysts preferably used in fuel cells, and fuel cell electrodes.

2. Description of the Related Art

Fuel cells convert chemical energy of fuel into electric energy directly by electrochemically oxidizing fuel such as hydrogen or methanol. The fuel cell has attracted extensive attention as a clean power source because there is no production of $NO_x$, $SO_x$, etc. as caused by thermal power generation. Particularly polymer electrolyte fuel cells has been developed as a power supply for spaceship use because the size, weight and thickness of the polymer electrolyte fuel cells can be reduced compared with those of other fuel cells. Recently the polymer electrolyte fuel cells have been studied extensively as a power supply for automobile and mobile use.

The related-art fuel cells have not been spread widely because the performance of the fuel cells is still insufficient at temperature range lower than 100° C.

Power generation by fuel cells is based on an oxidation reduction reaction generated on electrodes. High active catalysts are essential to improve the performance of the fuel cell. Particularly the catalysts are apt to be poisoned regardless of whether the fuel cell is a hydrogen type polymer electrolyte fuel cell (PEMFC) using a reformed gas as fuel or whether the fuel cell is a methanol type polymer electrolyte fuel cell using a methanol solution as fuel (DMFC) because CO is contained in the raw material or intermediate product. The CO poisoning suppressing ability of PtRu catalysts currently mainly used as the anode catalyst is more excellent than Pt catalysts but is still insufficient. For example, in the case of DMFCs, voltage loss caused by the PtRu anode catalyst is about 0.3 V which accounts for about 25% of the voltage 1.21 V theoretically allowed to be generated.

In addition, in the PtRu catalyst, dissolution of Ru and the migration of Ru to an oxidant electrode during power generation were observed. It is necessary to improve durability of the PtRu catalyst.

To improve activity and durability of anode catalyst, extensive investigation have been made such as adding transition metal to PtRu alloy and changing carrier material.

Particularly addition of Sn to noble metal-containing catalyst has attracted attention.

For example, in JP-A-2004-28117, a $Pt_{60}Ru_{15}Sn_{20}$ alloy thin film produced by sputtering method has been evaluated by activity current measurement according to an electrochemical method using an aqueous solution of dilute sulfuric acid. In T. Kim et al, Chemistry Letters Vol.33 (4) (2004) pp.478-479, $Pt_{3-5}Ru_{2-4}Sn$ alloy fine particles carried on carbon black produced by a liquid phase reduction method have been evaluated by activity current measurement according to an electrochemical method using an aqueous solution of dilute sulfuric acid. These documents have reported that the activity of the alloy is higher than that of PtRu alloy produced in the same manner.

However, higher activity and higher durability are expected in the catalyst including Pt, Ru and Sn.

The invention provides Pt—Ru—Sn catalyst with excellent activity and durability. The invention also provides fuel cells with high output and high durability.

SUMMARY OF THE INVENTION

According to an aspect of the invention, there is provided catalysts containing noble metal-containing particles that have a composition (except oxygen) represented by a formula $Pt_XRu_YA_ZSn_S$ and exhibits a mean particle diameter of from 0.5 nm to 10 nm, both inclusively. A is at least one element selected from a group consisting of Rh, Au, Pd, Ir and Os, and X, Y, Z and S are atomic ratios satisfying relations $30 \leq X \leq 70$, $30 \leq Y \leq 70$, $0 \leq Z \leq 40$, $0.5 \leq S \leq 8$ and $X+Y+z+S=100$.

According to another aspect of the invention, there is provided fuel cell electrodes including catalysts which contain noble metal-containing particles with a composition (except oxygen) represented by a formula $Pt_XRu_YA_ZSn_S$ and exhibiting a mean particle diameter of from 0.5 nm to 10 nm, both inclusively, wherein A is at least one element selected from a group consisting of Rh, Au, Pd, Ir and Os, and X, Y, Z and S are atomic ratios satisfying relations $30 \leq X \leq 70$, $30 \leq Y \leq 70$, $0 \leq Z \leq 40$, $0.5 \leq S \leq 8$ and $X+Y+Z+S=100$.

According to yet another aspect of the invention, fuel cells include fuel electrodes containing catalysts, an oxidant electrode, and an electrolytic membrane disposed between the fuel electrode and the oxidant electrode, where the catalysts contain noble metal-containing particles with a composition except oxygen represented by a formula $Pt_XRu_YA_ZSn_S$ and exhibiting a mean particle diameter of from 0.5 nm to 10 nm, both inclusively, wherein A is at least one element selected from a group consisting of Rh, Au, Pd, Ir and Os, and X, Y, Z and S are atomic ratios satisfying relations $30 \leq X \leq 70$, $30 \leq Y \leq 70$, $0 \leq Z \leq 40$, $0.5 \leq S \leq 8$ and $X+Y+Z+S=100$.

According to the invention, catalysts having high activity and high durability can be obtained. When the catalyst is used, fuel cells having high output and high durability can be achieved.

DETAILED DESCRIPTION OF THE INVENTION

Preferably, in the invention, the noble metal-containing particles are supported by a carrier. Preferably, the catalysts contain particles of tin oxide supported by the carrier.

Preferably, in the invention, a portion except the carrier and oxygen has a composition represented by the formula $Pt_XRu_YA_ZSn_S$ (in which A is at least one element selected from the group consisting of Rh, Au, Pd, Ir and Os, and x, y, z and s are atomic ratios satisfying the relations $20 \leq x \leq 42$, $20 \leq y \leq 40$, $0 \leq z \leq 30$, $0.8 \leq s \leq 20$ and $x+y+z+s=100$); and the X-ray diffraction pattern of the composition exhibits a peak (I) indicating crystalline plane spacing of from 0.216 nm to 0.225 nm, both inclusively, and a peak (II) indicating crystalline plane spacing of from 0.255 nm to 0.268 nm, both inclusively, while the ratio (%) of the area of the peak (II) to the area of the peak (I) is from 3% to 20%, both inclusively.

Catalysts contain noble metal-containing particles with a composition exclusive of oxygen represented by the formula $Pt_XRu_YA_ZSn_S$ (in which A is at least one element selected from the group consisting of Rh, Au, Pd, Ir and Os, and X, Y, Z and S are atomic ratios satisfying the relations $30 \leq X \leq 70$, $30 \leq Y \leq 70$, $0 \leq Z \leq 30$, $0.5 \leq S \leq 8$ and $X+Y+Z+S=100$) and with a mean particle diameter in a range of from 0.5 nm to 10 nm, both inclusive.

<Action of Noble Metal-containing Particle>

Figure 1:
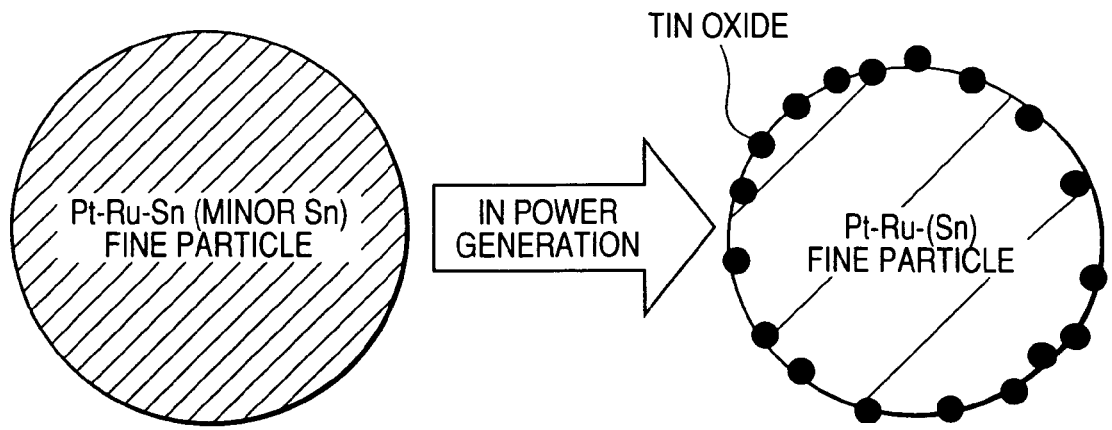
FIG. 1 is a typical view of the formation of the catalysts with fine tin oxide particles dispersed on the surface of noble metal-containing particles.

FIG. 1 shows a typical view of each noble metal-containing particle.

The present inventors have found out the following phenomenon. That is, when noble metal-containing particles containing Pt, Ru, and Sn as shown on the left of FIG. 1 are used in a fuel electrodes of fuel cells for generating electric power, Sn precipitates to the surfaces of the noble metal-containing particles from the insides of the noble metal-containing particles during power generation, so that Sn oxide is formed on the surfaces of the noble metal-containing particles as shown on the right of FIG. 1. In this case, it is conceived that the location, morphology and structure of Sn precipitated during power generation largely depend on the amount of Sn. In the case of catalysts according to the invention, it is conceived that the amount of Sn contained in the catalysts is so small that precipitated Sn oxide is present in the morphology of a cluster of several atoms on the surface of each noble metal-containing particle to thereby bring coexistence of the Sn oxide cluster and a PtRu or PtRuSn particle. Thus, it is conceived that a promoter effect of Sn and catalysts effect of PtRu are exhibited effectively and, at the same time, movement of Ru is suppressed so that the catalysts according to the invention exhibit high activity and high durability. Incidentally, it may be also conceived that Sn is not precipitated completely as Sn oxide. There may be a possibility that Sn remaining near the surface of the particle will exert influence on the electronic state of the particle and interaction between the clustered Sn component and the particle.

<Composition of Noble Metal-containing Particle>

The noble metal-containing particle contains Pt, Ru and Sn as essential components. Pt and Ru are primary catalysts elements. Pt is extremely effective in oxidizing hydrogen and dehydrogenating organic fuel. Ru is extremely effective in suppressing CO poisoning. Sn serves as a promoter of the catalytic action of Pt and Ru.

The Pt content X (atomic %) of the noble metal-containing particle satisfies the relation $30 \leq X \leq 70$. The Ru content Y (atomic %) of the noble metal-containing particle satisfies the relation $20 \leq Y \leq 50$. Especially preferably, the Pt content X and the Ru content Y satisfy the relations $35 \leq X \leq 65$ and $25 \leq Y \leq 45$.

Catalytic activity may be improved when another noble metal-containing element A is used in addition to Pt and Ru. Preferably, the noble metal-containing element A is at least one element selected from the group consisting of Rh, Au, Pd, Ir, Os and Ag. Especially preferably, the noble metal-containing element A is at least one element selected from the group consisting of Rh, Ir and Os. In order to obtain catalytic activity, the amount Z (atomic %) of the noble metal-containing element A preferably satisfies the relation $0 \leq Z \leq 40$, especially preferably satisfies the relation $0 \leq Z \leq 30$.

The Sn content S (atomic %) of the noble metal-containing particle satisfies the relation $0.5 \leq S \leq 8$. When the Sn content S is smaller than 0.5%, it is conceived that the promoting action of Sn is low. When the Sn content S is larger than 8% so that a large amount of Sn is contained in the inside of the particle, there is fear that the number of primary activity sites formed from Pt and Ru atoms will be reduced to result in lowering of catalytic activity because the surface of the noble metal-containing particle is covered with the Sn oxide cluster or large Sn oxide. Especially preferably, the Sn content S (atomic %) satisfies the relation $1 \leq S \leq 7$.

Almost of the Pt—Ru—Sn fine particles examined in the background contain 10 atomic % or more of Sn ($S \geq 10$). This may be conceivably a main reason why highly activity Pt—Ru—Sn has not been found yet. The invention is characterized in that the Sn content of the noble metal-containing particle to be used is small.

The noble metal-containing particle may contain another transition metal element. Catalytic activity may be improved when at least one metal element selected from the group consisting of Zr, Ti, W, Ta, Fe, Co and Ni is added in combination with Sn. It is preferable that the amount of the metal element to be added is substantially equal to the Sn content.

Although the invention allows presence of oxygen in the noble metal-containing particle, the composition of the noble metal-containing particle in this specification is regarded as a composition exclusive of oxygen. When oxygen is contained in the noble metal-containing particle, both catalytic activity and durability have a tendency toward greater improvement. This may be, conceivably, because oxygen contributes to formation of the Sn oxide cluster and stable presence of the Sn oxide cluster on the surface of the noble metal-containing particle. The quantity of presence of oxygen, however, does not affect the effect of the invention because oxygen is adsorbed on a carrier so that the oxygen content varies when in use.

<Diameter and Structure of Noble Metal-containing Particle>

Whether catalytic activity is high or low depends on the electronic state of the surface of the catalyst material, the atomic configuration state thereof, the surface state thereof, etc. Since the surface state particularly tends to depend on the size of the particle, a proper particle diameter is important for catalytic activity and durability.

Particles having a mean particle diameter in a range of from 0.5 nm to 10 nm (both inclusive) are used as the noble metal-containing particles. Preferably, the mean particle diameter of the particles is in a range of from 1 nm to 5 nm (both inclusive). If the mean particle diameter of the particles is smaller than 0.5 nm, the catalysts deteriorate in durability. If the mean particle diameter of the particles is larger than 10 nm, the durability and catalytic activity are lowered. This may be, conceivably, because the Sn oxide cluster is hardly adsorbed on the surface of the large particles and hardly kept stable.

Preferably, the noble metal-containing particles have a peak (hereinafter referred to as "peak (I)") at which the crystalline plane spacing in the X-ray diffraction pattern is in a range of from 0.218 nm to 0.225 nm (both inclusive). When the noble metal-containing particles having a peak in this range are used, catalytic activity is excellent.

<Carrier>

Although noble metal-containing particles may be used singly as the catalysts, it is preferable that noble metal-containing particles supported on a carrier are used as the catalysts. Although there is no particular limitation in the shape of the carrier, examples of the carrier include powder of known electrically conductive materials represented by carbon and ceramic materials (such as titanium oxide, silica, and tin oxide). Particularly, carbon black is a representative of the electrically conductive materials but any electrically conductive material may be used without any limitation. For example, a fiber-shaped, tube-shaped or coil-shaped nanocarbon material may be used. When noble metal-containing particles are supported on the carrier having such a different surface state, there may be conceivably possibility that activity is further improved.

The weight ratio of the noble metal-containing particles to the whole of the catalysts in a state in which the noble metal-containing particles are supported on the carrier is preferably in a range of from 10% by weight to 70% by weight (both inclusive). If the weight ratio is too high, the catalysts are apt to be aggregated. If the weight ratio is too low, it is difficult to obtain sufficient power generation capacity.

The size of the electrically conductive material powder is preferably in a range of from 30 nm to 300 nm (both inclusive) in terms of mean particle diameter. When the size of the conductive material powder is in this range, an appropriate catalytic layer structure can be formed so that fuel supply can be smoothened.

<Tin Oxide Particle>

Figure 2:
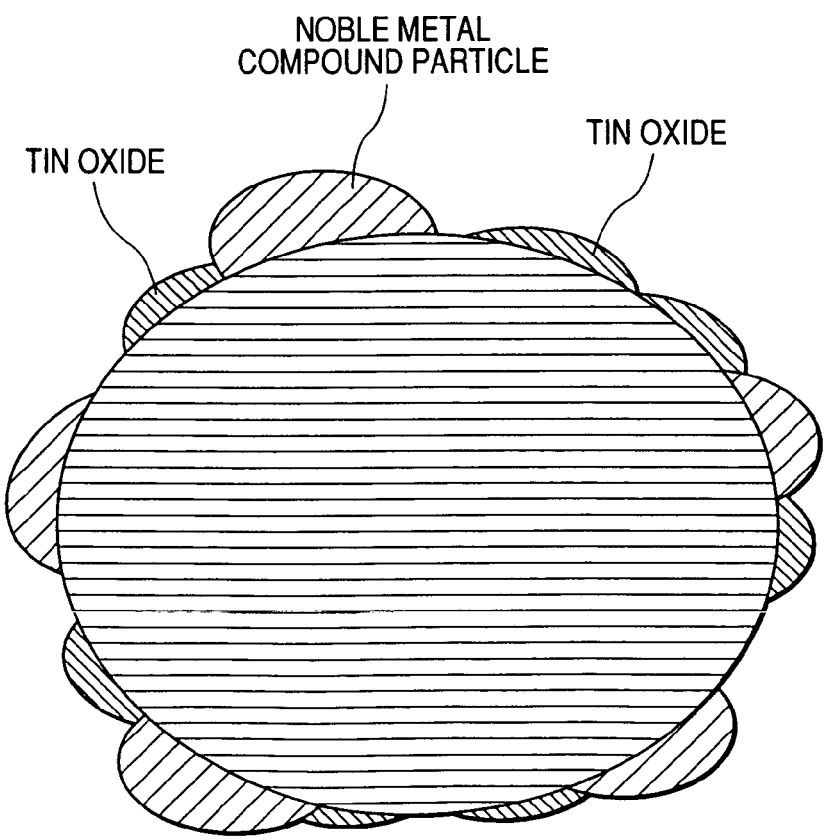
FIG. 2 is a typical view of supported catalysts where noble metal-containing particles and tin oxide are supported on a carrier.

It is preferable that tin oxide particles and the noble metal-containing particles are both supported on the carrier. Tin oxide serves as a promoter. Catalysts containing tin oxide are effective in improving durability. FIG. 2 shows a typical view of catalysts with noble metal-containing particles and tin oxide both supported on a carrier.

In the catalysts according to the invention, when the amount of tin oxide particles which locate besides the noble metal-containing particles is increased, durability of the catalysts can be improved even in the case where the Sn content of the noble metal-containing particles is small. In this case, a high amount of Sn content is required.

The size of the tin oxide particles is preferably in a range of from 0.5 nm to 10 nm (both inclusive) in terms of mean particle diameter.

Preferably, the tin oxide particles exhibit a peak (hereinafter referred to as peak (II)) in the X-ray diffraction pattern, the peak indicating that the crystalline plane spacing is in a range of from 0.255 nm to 0.268 nm (both inclusive).

As for a standard of the amount of the tin oxide particles, it is preferable that the catalysts exclusive of the carrier and oxygen has a composition represented by the formula $Pt_xRu_yA_zSn_S$ (in which A is at least one element selected from the group consisting of Rh, Au, Pd, Ir and Os, and x, y, z and s are atomic ratios satisfying the relations $20 \leq x \leq 42$, $20 \leq y \leq 40$, $0 \leq y \leq 30$, $0.8 \leq s \leq 20$ and $x+y+z+s=100$). If the tin oxide is so much that the tin oxide content s exceeds 20, cell resistance becomes so large that performance is apt to be lowered. If the tin oxide content s is smaller than 0.8, there is fear that durability is deteriorated.

In this specification, the ratio of the area of the peak (II) to the area of the peak (I) in the X-ray diffraction pattern is defined as "tin oxide ratio" (i.e. tin oxide ratio (%)=100× (peak (II) area/peak (I) area). In the catalysts, the tin oxide ratio is preferably in a range of from 3% to 20% (both inclusive). If the area of the peak (II) is too large relative to the area of the peak (I), cell resistance is apt to be increased. If the area of the peak (II) is too small relative to the area of the peak (I), there is fear that durability is lowered.

Incidentally, the mean particle sizes and compositions of the noble metal-containing particles and the tin oxide particles described in this specification are defined as follows. The diameters and compositions of 20 particles are measured in arbitrary five different visual fields by TEM observation and TEM-EDX analysis. Averages of the diameters and compositions of 100 particles in total are defined as the mean particle size and composition.

<Production Method>

Next, a method for producing catalysts will be described.

The method for producing catalysts is not limited particularly. Examples of the method include an impregnating method, a precipitating method, a co-precipitating method, a colloidal method, and an ion exchange method. Examples of the method further include a physical vapor deposition method, a sputtering method, etc.

(1) To prepare the catalysts without carrier, it is preferable to use a liquid phase reduction method, in which the constituent elements (such as Pt, Ru, Sn etc.) containing salts are reduced in a liquid state, instead of the method in which heat treatment is necessary, because the particle growth easily occurs during heat treatment.

Specifically, after a solution of the constituent elements (such as Pt, Ru, Sn etc.) containing salts is mixed with an organic solvent and a colloidal stabilizer, a reductant is dripped into the solution and then the solution is washed and dried.

$NaBH_4$, $N_2H_2$, and $HCOOH$ etc. can be used as the reductant, polyvinyl alcohol, and $SB_{12}$ can be used as the colloidal stabilizer.

As occasion demands, the catalysts may be further heated-treated to eliminate the unnecessary adsorbate from the surface of the catalysts.

To produce the catalysts without coexistence of Sn oxide particles, those locating besides the noble metal-containing particles, it is important to combine a reductant and a surface active agent to accelerate alloying. It is necessary to adjust the charge composition so that an appropriate amount of Sn can be contained in the noble metal-containing particles. To produce the catalysts with coexistence of Sn oxide particles, it is necessary to adjust not only the charge composition but also the kind of the metal salt, the reductant, etc. As occasion demands, post-treatment may be used preferably.

(2) To prepare the catalysts with carrier, i.e., the catalysts with noble metal-containing particles supported on carrier, a method for producing catalyst precursor by a precipitating method and reducing the catalyst precursor in vapor phase is used preferably so that the size of each catalyst particle and the aggregation of the particles can be suppressed easily.

First, after a solution of the constituent elements (such as Pt, Ru, Sn, etc.) containing salts is mixed with a solution containing carrier particles, a precipitant is dripped into the mixture solution and then the mixture solution is washed and dried. In this manner, catalyst precursor containing a carrier and hydroxide or oxide supported on the carrier is produced.

Next, the catalyst precursor is put in a heat treatment furnace and heat-treated, for example, at a temperature of from room temperature (20° C.) to 300° C. (both inclusive) in an atmosphere of oxygen exhibiting a partial pressure lower than 5%. For production of catalysts without coexistence of Sn oxide, it is preferable that the Sn content of the charge composition is set to be small, and that heat treatment is performed at a temperature of from 50° C. to 300° C. (both inclusive). If the temperature is lower than 50° C., there is fear that alloying of Sn will be reduced. If the temperature is higher than 300° C., there is possibility that stability of fuel cells performance will be lowered due to growth of catalyst particles. To produce the catalysts with coexistence of Sn oxide particles, high Sn content of the charge composition is preferable, and that heat treatment is performed at a temperature of from room temperature to 150° C. (both inclusively). If the temperature is higher than 150° C., there is possibility that the Sn content of the catalyst fine particles will become excessively large. If the temperature is lower than the room temperature, there is fear that alloying of Sn will be insufficient or the distribution of Sn will be inhomogeneous. Although the time for heat treatment depends on the temperature for heat treatment, it is generally preferable that the time for heat treatment time is set to be in a range of from 0.1 hours to 6 hours.

<Use Method of Catalysts>

The catalysts according to the invention can be used as catalysts for reforming liquid fuel such as ethanol or methanol used in fixed reformed fuel cells or mobile fuel cells or for CO oxidation reaction or as catalysts for an electrode in direct liquid fuel supply type fuel cells using liquid fuel such as ethanol or methanol. The catalysts according to the invention may be combined with other catalysts to form composite catalysts in accordance with the purpose.

An example of the configuration of electrode for a direct methanol supply type fuel cells and the fuel cells will be described below.

<Electrode for Direct Methanol Supply Type Fuel cell>

Although the catalysts may be used directly as an electrode for a direct methanol supply type fuel cell, it is practical that the catalysts are used in a state in which the catalysts are supported by an electrode support.

The electrode can be obtained in such a manner that an obtained suspension is applied on a desired electrode support such as a sheet of porous carbon paper and then dried. In addition to this catalytic composition, an ion conductive material may be added to the electrode. An additive used in accordance with necessity may be added to the electrode.

Although any material may be used as the ion conductive material as long as the material has ion conducting performance, a desirable result can be obtained when a material the same as that of an electrolytic membrane is used as the ion conductive material. Examples of the additive used in accordance with necessity include electrically conductive materials represented by carbon, and water repellent materials represented by tetrafluoroethylene.

Examples of the electrode support, besides the sheet of porous carbon paper, include thin membranes, meshes or sponges of gold, platinum, stainless steel, nickel or the like, and known electrically conductive particles represented by particles of titanium oxide, silica, tin oxide or the like.

As the supporting method, there may be used a vacuum thin membrane producing method represented by sputtering or chemical vapor deposition, or a chemical or electrochemical method such as plating, electroless plating or impregnation. Alternatively, a method such as arc dissolution or mechanical milling may be used.

<Direct Methanol Supply Type Fuel cell>

Next, an embodiment of the structure of the fuel cells will be described.

Figure 3:
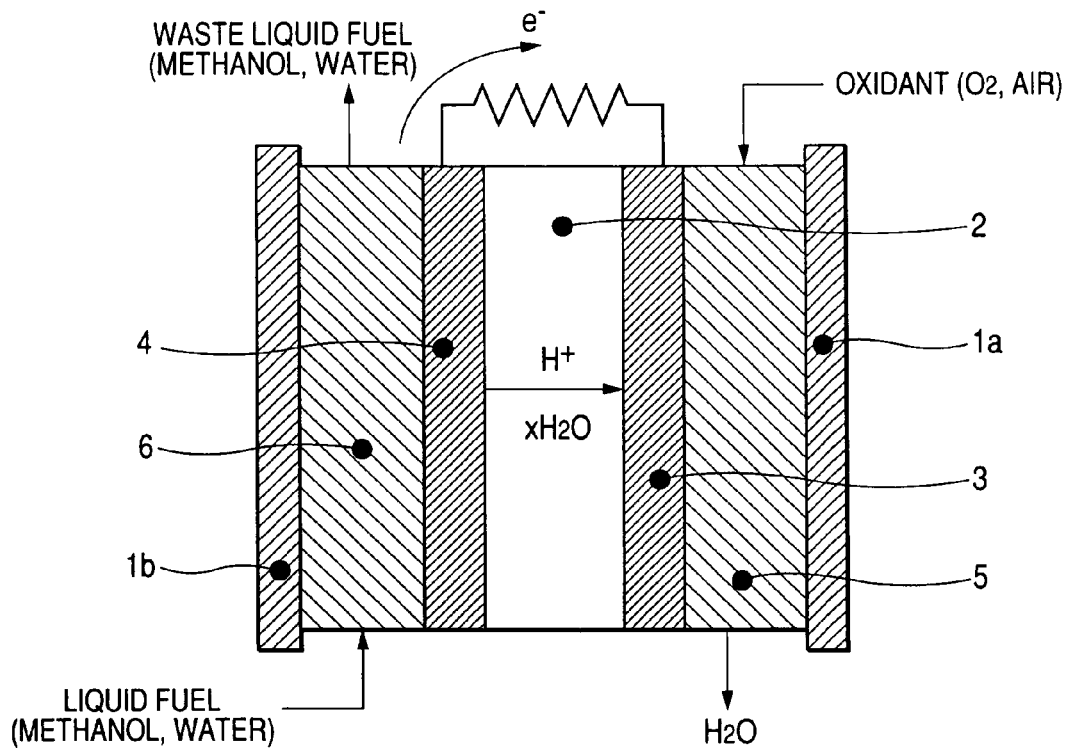
FIG. 3 is a schematic of a fuel cell.

FIG. 3 is a schematic a single cell in the fuel cell.

In FIG. 3, an electrolytic membrane 2, an oxidant electrode (cathode) 3 and fuel electrodes (anode) 4, an oxidant flow path 5 and a liquid fuel flow path 6 are provided in a housing 1a, 1b. The electrolytic membrane 2 is sandwiched between the oxidant electrode 3 and the fuel electrode 4. The oxidant flow path 5 and the liquid fuel flow path 6 are located in the outside of the electrolytic membrane 2, the oxidant electrode 3 and the fuel electrode 4.

An ion exchange membrane is used as the electrolytic membrane 2. Although an ion conductive type such as an anion conductive type or a cation conductive type can be used as the type of the ion exchange membrane, a proton conductive type maybe also used preferably. A material having anion or cation conducting performance such as a high-molecular membrane represented by a perfluoroalkyl sulfonate polymer can be used as the material of the ion exchange membrane.

The electrolytic membrane 2 is interposed so as to be sandwiched between the oxidant electrode 3 and the fuel electrode 4. Alternatively, the three may be bonded to one another in a hot pressing or casting membrane formation manner to form a membrane-electrode assembly. If necessary, a water repellant represented by polytetrafluoroethylene may be added to or laminated on the sheet of porous carbon paper.

The fuel electrode 4 is an electrode containing the methanol oxide catalysts as an effective component. The fuel electrode 4 is brought into contact with the electrolytic membrane 2. As the method for bring the fuel electrode 4 into contact with the electrolytic membrane 2, there can be used a known method such as hot pressing or casting membrane formation.

In most cases, the oxidant electrode 3 is formed in such a manner that platinum-supporting carbon mixed with an ion conductive material well is brought into contact with the electrolytic membrane 2. When the ion conductive material is the same as that of the electrolytic membrane 2, a desired result can be obtained. As the method for bring the oxidant electrode 3 into contact with the electrolytic membrane 2, there can be used a known method such as hot pressing or cast membrane formation. Besides platinum-supporting carbon, a known material such as a noble metal-containing or a noble metal-containing supporting material (electrode catalysts), an organometallic complex or a sintered product of the organometallic complex can be used as the oxidant electrode 3.

While an oxidant inlet (not shown) through which an oxidant (air in most cases) is introduced is provided in the upper side of the oxidant electrode 3, an oxidant outlet (not shown) through which unreacted air and a product (water in most cases) are discharged is provided in the lower side of the oxidant electrode 3. In this case, forced ventilation and/or forced drainage means may be provided. A hole for natural convection of air may be provided in the housing part 1a.

The liquid fuel flow path 6 is provided in the outside of the fuel electrode 4. Although the fluid fuel flow path 6 may be a flow path connected to an external fuel storage portion (not shown), the fluid fuel flow path 6 may be a region for storing methanol fuel.

As fuel to be directly supplied to the fuel electrode 4, methanol may be preferably used singly or a methanol-water mixture may be preferably used. When a methanol-water mixture is used as the fuel, crossover can be prevented effectively so that more excellent cell electromotance and output can be obtained.

Although a single cell is illustrated in the conceptual view of the direct methanol supply type fuel cells shown in FIG. 3, this single cell may be used in the invention as it is, or a plurality of cells may be connected in series and/or in parallel to form an available fuel cell. As the method for connecting the cells, a background-art connection method using a bipolar plate may be used or a planar connection method may be used. It is a matter of course that any other known connection method can be used effectively.

EXAMPLES

Although examples of the invention will be described below, the invention is not limited to the examples.

Example 1

Carrier supported catalysts were produced by the following method.

In this example, catalyst precursor was produced by a precipitating process.

That is, 10 g of carbon black with a mean particle diameter of 50 nm used as a carrier were first mixed with 1000 ml of water by a homogenizer to prepare a suspension. After the suspension was put in a three neck flask to which a mechanical stirrer, a reflux condenser pipe and a drip funnel were attached, the suspension was stirred at reflux for an hour.

Then, an aqueous solution of $H_2PtCl_6$, an aqueous solution of $H_2RuCl_5$ and an aqueous solution of $H_2SnCl_6$ (metal content of each solution: 0.25 mol/l) were added.

The amounts of the respective aqueous solutions added at the time of production of the catalyst precursor and the molar ratios Pt/Ru/Sn in the charge composition were as shown in Table 1.

After 20 minutes, 1 mol/l of sodium hydrogen carbonate as a precipitating medium was dripped gradually until PH reached 9. After dripping, a precipitate was washed with pure water well and dried at 100° C. to prepare catalyst precursor.

Then, the catalyst precursor was reduced in vapor phase. After dried, the resulting sample was put in a high purity zirconia boat. After the sample was reduced in a cylindrical furnace at 200° C. for an hour while 30% $H_2/N_2$ gas was poured at a flow rate of 100 ml/min. Then, the temperature was returned to room temperature to obtain catalysts.

Incidentally, the carrier supported catalysts produced by this method are referred to as a 200° C. heat-treated article because the temperature for reducing the carrier supported catalysts is 200° C.

The composition of the obtained catalysts was confirmed by chemical analysis. The morphology, constituent and composition of particles on the catalysts were observed by transmission electron microscope (TEM) analysis. In addition, XRD analysis was performed to examine the constituent and structure of the catalysts.

It was confirmed by TEM analysis that noble metal-containing particles were supported on the surface of the carrier, the mean diameter of the noble metal-containing particles was about 2.5 nm, and the composition ratio of respective elements in the noble metal-containing particles was substantially equal to the ratio in the charge composition. Carbon or noble metal-containing particles could be specified from the respective peaks in an X-ray diffraction pattern.

It was found that the crystalline plane spacing in the main peak except carbon was in a range of from 0.216 nm to 0.225 nm (peak (I)). In the X-ray diffraction pattern, the peak indicating the crystalline plane spacing in a range of from 0.255 nm to 0.268 nm (peak (II)) was not observed except peaks caused by carbon and the noble metal-containing particles.

TABLE 1

| Example | Production Process | Amounts of Solutions (ml) * | Charge Composition (atomic %) ** | Tin Oxide Ratio | Single Cell Voltage (V) | Resistance (mΩ) | Durability |
|---|---|---|---|---|---|---|---|
| Example 1 | 200° C. Heat-Treated Article | 50/50/1 | $Pt_{49.5}Ru_{49.5}Sn$ | 0 | 0.50 | 16.5 | C |
| Example 2 | 200° C. Heat-Treated Article | 50/50/2 | $Pt_{49}Ru_{49}Sn_2$ | 0 | 0.52 | 16.5 | C |
| Example 3 | 200° C. Heat-Treated Article | 50/50/4 | $Pt_{48.1}Ru_{48.1}Sn_{3.8}$ | 0 | 0.53 | 17.0 | B |
| Example 4 | 200° C. Heat-Treated Article | 50/50/6 | $Pt_{47.2}Ru_{47.2}Sn_{5.6}$ | 0 | 0.54 | 17.0 | B |
| Example 5 | 200° C. Heat-Treated Article | 50/50/8 | $Pt_{46.3}Ru_{46.3}Sn_{7.4}$ | 0 | 0.51 | 18.0 | A |
| Example 6 | 200° C. Heat-Treated Article | 40/30/1 | $Pt_{39.6}Ru_{29.7}Rh_{9.9}Ir_{9.9}Os_{9.9}Sn$ | 0 | 0.51 | 17.0 | C |
| Comparative Example 1 | 200° C. Heat-Treated Article | 50/50/0 | $Pt_{50}Ru_{50}$ | 0 | 0.48 | 16.5 | C |
| Comparative Example 2 | 200° C. Heat-Treated Article | 50/50/12 | $Pt_{44.65}Ru_{44.65}Sn_{10.7}$ | 0 | 0.45 | 20.0 | A |
| Comparative Example 3 | 200° C. Heat-Treated Article | 50/50/20 | $Pt_{41.65}Ru_{41.65}Sn_{16.7}$ | 0 | 0.37 | 21.0 | A |
| Example 7 | 50° C. Heat-Treated Article | 50/50/6 | $Pt_{47.2}Ru_{47.2}Sn_{5.6}$ | 3% | 0.53 | 17.0 | B |
| Example 8 | 50° C. Heat-Treated Article | 50/50/25 | $Pt_{40}Ru_{40}Sn_{20}$ | 8% | 0.52 | 18.0 | A |
| Example 9 | 50° C. Heat-Treated Article | 50/50/40 | $Pt_{36.7}Ru_{36.7}Sn_{28.6}$ | 15% | 0.51 | 18.0 | A |
| Comparative Example 4 | 800° C. Heat-Treated Article | 50/50/6 | $Pt_{47.2}Ru_{47.2}Sn_{5.6}$ | 0 | 0.44 | 17.0 | C |
| Comparative Example 5 | 800° C. Heat-Treated Article | 50/50/0 | $Pt_{50}Ru_{50}$ | 0 | 0.43 | 16.5 | C |
| Example 10 | Liquid Phase Article | 50/50/6 | $Pt_{47.2}Ru_{47.2}Sn_{5.6}$ | 0 | 0.49 | 17.0 | B |
| Example 11 | Liquid Phase Article | 50/50/6 | $Pt_{47.2}Ru_{47.2}Sn_{5.6}$ | 0 | 0.49 | 16.5 | C |
| Comparative Example 6 | Liquid Phase Article | 50/50 | $Pt_{50}Ru_{50}$ | 0 | 0.47 | 17.0 | C |

TABLE 1-continued

| Example | Production Process | Amounts of Solutions (ml) * | Charge Composition (atomic %) ** | Tin Oxide Ratio | Single Cell Voltage (V) | Resistance (mΩ) | Durability |
|---|---|---|---|---|---|---|---|
| Comparative Example 7 | Liquid Phase Article | 50/50/12 | $Pt_{44.65}Ru_{44.65}Sn_{10.7}$ | 0 | 0.43 | 20.0 | B |
| Comparative Example 8 | Liquid Phase Article | 50/50/40 | $Pt_{36.7}Ru_{36.7}Sn_{28.6}$ | 0 | 0.33 | 22.0 | B |

Note:
* The added amounts of aqueous solution of $H_2PtCl_6$/aqueous solution of $H_2RuCl_5$/aqueous solution of $H_2SnCl_6$.
** The molar ratio Rt/Ru/Sn in the charge composition.

Examples 2 to 5 and Comparative Examples 1 to 3

Carrier supported catalysts were obtained in the same manner as in Example 1 except that the mixture ratio of the aqueous solutions of $H_2PtCl_6$, $H_2RuCl_5$ and $H_2SnCl_6$ was changed at the time of production of the catalyst precursor. The amounts of the aqueous solutions added at the time of production of the catalyst precursor and the molar ratio Pt/Ru/Sn in the charge composition were as shown in Table 1. Chemical analysis, TEM analysis and XRD analysis of the obtained carrier supported catalysts were performed in the same manner as in Example 1.

With respect to each of samples used in Examples 2 to 5 and Comparative Examples 1 to 3, it was confirmed from TEM analysis that noble metal-containing particles were supported on the surface of the carrier in the same manner as in Example 1, that the mean diameter of the noble metal-containing particles was about 2.5 nm, and that the composition ratio of the respective elements in the noble metal-containing particles was substantially equal to that in the charge composition.

The respective peaks in the X-ray diffraction pattern could specify carbon or the noble metal-containing particles. It was found that the crystalline plane spacing at the main peak except carbon was in a range of from 0.216 nm to 0.225 nm (peak (I)). In the X-ray diffraction pattern, the peak indicating the crystalline plane spacing in a range of from 0.255 nm to 0.268 nm (peak (II)) was not observed except peaks caused by carbon and the noble metal-containing particles.

Example 6

Carrier supported catalysts were produced in the same manner as in Example 1 except that an aqueous solution of $RhCl_3$, an aqueous solution of $Na_2IrCl_6$ and an aqueous solution of OsC13 (the amount of each aqueous solution added was 10 ml and the metal content of each aqueous solution was 0.25 mol/l) were added in addition to the aqueous solutions of $H_2PtCl_6$, $H_2RuCl_5$ and $H_2SnCl_6$ (the amount of each aqueous solution is shown in Table 1). Chemical analysis, TEM analysis and XRD analysis of the obtained carrier supported catalysts were performed in the same manner as in Example 1. It was confirmed that the composition of the obtained carrier supported catalysts and the composition of the noble metal-containing particles were substantially equal to the charge composition, that the noble metal-containing particles were supported on the surface of the carrier, and that the mean diameter of the noble metal-containing particles was about 2.5 nm. The respective peaks in the X-ray diffraction pattern could specify carbon or the noble metal-containing particles.

It was found that the crystalline plane spacing at the main peak except carbon was in a range of from 0.216 nm to 0.225 nm (peak (I)). In the X-ray diffraction pattern, the peak indicating the crystalline plane spacing in a range of from 0.255 nm to 0.268 nm (peak (II)) was not observed except peaks caused by carbon and the noble metal-containing particles.

Examples 7 to 9

Catalysts were produced in the same manner as in Example 1 except that the temperature for heat treatment in the reducing process was set at 50° C., and that the mixture ratio of the aqueous solutions of $H_2PtCl_6$, $H_2RuCl_5$ and $H_2SnCl_6$ was changed. The amounts of the respective aqueous solutions added at the time of production of the catalyst precursor and the molar ratio Pt/Ru/Sn in the charge composition were as shown in Table 1.

Incidentally, the carrier supported catalysts produced by this method are referred to as 50° C. heat-treated article because the temperature in the reducing process is 50° C.

Chemical analysis, TEM analysis and XRD analysis of the obtained carrier supported catalysts were performed in the same manner as in Example 1.

With respect to each of samples used in Examples 7 to 9, it was found from TEM analysis that oxide containing tin was supported on the surface of the carrier while noble metal-containing particles were supported on the surface of the carrier. It was also confirmed that the mean particle diameter of the noble metal-containing particles was about 2.5nm.

As a result of examination into the composition of the noble metal-containing particles, the composition ratio of Pt and Ru was kept the same as charged but the tin content (except the carrier and oxygen) was about 3-7 atomic %. It was found that the tin content was lower than the tin content of the charge composition. It is conceived that alloying was suppressed by the low temperature used in heat treatment.

In the X-ray diffraction pattern, a peak at which the crystalline plane spacing was in a range of from 0.255 nm to 0.268 nm (peak (II)) was observed, besides the peaks caused by carbon and noble metal-containing particles. It was found from comparison with a result of TEM observation that the peak (II) was caused by tin oxide.

The ratio of the area of the peak caused by tin oxide fine particles with crystalline plane spacing in a range of from 0.255 nm to 0.268 nm (peak (II)) to the area of the peak caused by noble metal-containing particles with crystalline plane spacing in a range of from 0.216 nm to 0.225 nm (peak (I)), that is, the tin oxide ratio (%) was as shown in Table 1.

Comparative Examples 4 and 5

Carrier supported catalysts were produced (as each of Comparative Examples 4 and 5) in the same manner as in Example 4 and Comparative Example 1 except that the reduction heat treatment was performed at 800° C. for 4 hours.

Chemical analysis, TEM analysis and XRD analysis of the obtained carrier catalysis were performed in the same manner as in Example 1.

Comparative Examples 4 and 5 were the same as Example 4 and Comparative Example 1 respectively except that the mean particle diameter of the noble metal-containing particles was about 12 nm.

Incidentally, the carrier supported catalysts produced in this manner are referred to as 800° C. heat-treated article because the temperature used in the reaction heat treatment is 800° C.

Example 10 and Comparative Examples 6 to 8

Carrier supported catalysts were produced by a liquid phase reduction method which will be described below.

First, 10 g of carbon black with a mean particle diameter of 50 nm used as a carrier were mixed with 700 ml of water and 300 ml of methanol by a homogenizer to prepare a suspension. After the suspension was put in a three neck flask to which a mechanical stirrer, a reflux condenser pipe and a drip funnel were attached, the suspension was stirred at reflux for an hour.

Then, an aqueous solution of $H_2PtCl_6$, an aqueous solution of $H_2RuCl_5$ and an aqueous solution of $H_2SnCl_6$ (metal content of each solution: 50 mg/ml) were added.

After 20 minutes, 50 ml of 1 mol/l $SB_{12}$ were added as a colloidal stabilizer (surface active agent). Further after 20 minutes, an aqueous solution of sodium hydrogen carbonate containing 5 mol/l of NaBH4 as a reductant was dripped gradually until PH reached 9. After dripping, the resulting precipitate was washed with pure water well and then dried at 100° C. to prepare catalysts.

Incidentally, the carrier supported catalysts produced by this method are referred to as liquid phase article.

Chemical analysis, TEM analysis and XRD analysis of the obtained carrier supported catalysts were performed in the same manner as in Example 1. It was confirmed that the composition of the carrier supported catalysts was substantially the same as the charge composition.

Although noble metal-containing particles were supported on the surface of the carrier, variation in diameter was large and the mean particle diameter was about 5 nm. Supporting on the carrier was worse than that in the 200° C. heat-treated article or the 50° C. heat-treated article. Remarkable aggregation was observed. It was also confirmed that the composition of respective elements in the noble metal-containing particles was substantially the same as the charge composition.

Respective peaks in the X-ray diffraction pattern could specify carbon or the noble metal-containing fine particles. The peak at which the crystalline plane spacing was in a range of from 0.216 nm to 0.225 nm (peak (I)) was observed as a main peak except carbon. The peak at which the crystalline plane spacing was in a range of from 0.255 nm to 0.268 nm (peak (II)) was not observed in the X-ray diffraction pattern except the peaks caused by carbon and the noble metal-containing particles.

The amounts of the respective aqueous solutions added at the time of production of the catalyst precursor and the molar ratio Pt/Ru/Sn in the added solutions were as shown in Table 1. A result of measurement of components except carbon (carrier) of the catalysts obtained by chemical analysis, a result of measurement of the composition of the noble metal-containing particles by TEM analysis and a result of measurement of the Sn oxide content ratio were as shown in Table 1.

Example 11

Catalysts were produced in the same manner as in Example 10 except that the carrier was not added. Chemical analysis, TEM analysis and XRD analysis of the obtained catalysts were performed in the same manner as in Example 10. Variation in diameter was large and the mean particle diameter was about 7 nm. Remarkable aggregation was observed. It was also confirmed that the composition of respective elements in the noble metal-containing particles was substantially the same as the charge composition.

(Catalysts Evaluation Test)

Each of the samples produced in Examples 1 to 11 and Comparative Examples 1 to 8 was used as anode catalysts to produce an anode electrode. The anode electrode was combined with a standard cathode electrode (carbon black-supporting Pt catalysts (with supporting density of about 50% by weight, available on the market and made by Tanaka Kikinzoku Kogyo K. K.) as a cathode catalysts) to produce fuel cell electrodes, a membrane-electrode assembly (MEA) and a single cell. The electrodes, the MEA and the single cell were evaluated as follows.

<Anode Electrode>

Three grams of the obtained catalysts were weighed and then mixed with 8 g of pure water, 15 g of 20% Nafion solution and 30 g of 2-ethoxyethanol. After stirred well, the resulting mixture solution was dispersed by a table ball mill to prepare a slurry composition. The slurry composition was applied on a sheet of water-repellent treated carbon paper (350 μm, made by Toray Industries, Inc.) and dried to produce an anode electrode in which loading density of the noble metal-containing catalysts was 3 mg/cm$^2$.

<Cathode Electrode>

First, 2 g of standard cathode catalysts were weighed and then mixed with 5 g of pure water, 5 g of 20% Nafion solution and 20 g of 2-ethoxyethanol. After stirred well, the resulting mixture solution was dispersed by a table ball mill to prepare a slurry composition. The slurry composition was applied on a sheet of water-repellent treated carbon paper (350 μm, made by Toray Industries, Inc.) and dried to produce a cathode electrode in which loading density of the noble metal-containing catalysts was 2 mg/cm$^2$.

<Production of Membrane-Electrode Assembly>

Each of the anode electrode and the cathode electrode was cut into a square size of 3.2 cm×3.2 cm so that the area of the electrode became 10 cm$^2$. A proton conductive polymer electrolyte membrane Nafion117 (made by Du Pont Kabushiki Kaisha) was sandwiched between the cathode electrode and the anode electrode and thermally pressure-bonded under pressure of 30 kg/cm$^2$ at 125° C. for 10 minutes to produce a membrane-electrode assembly (MEA).

Figure 4:
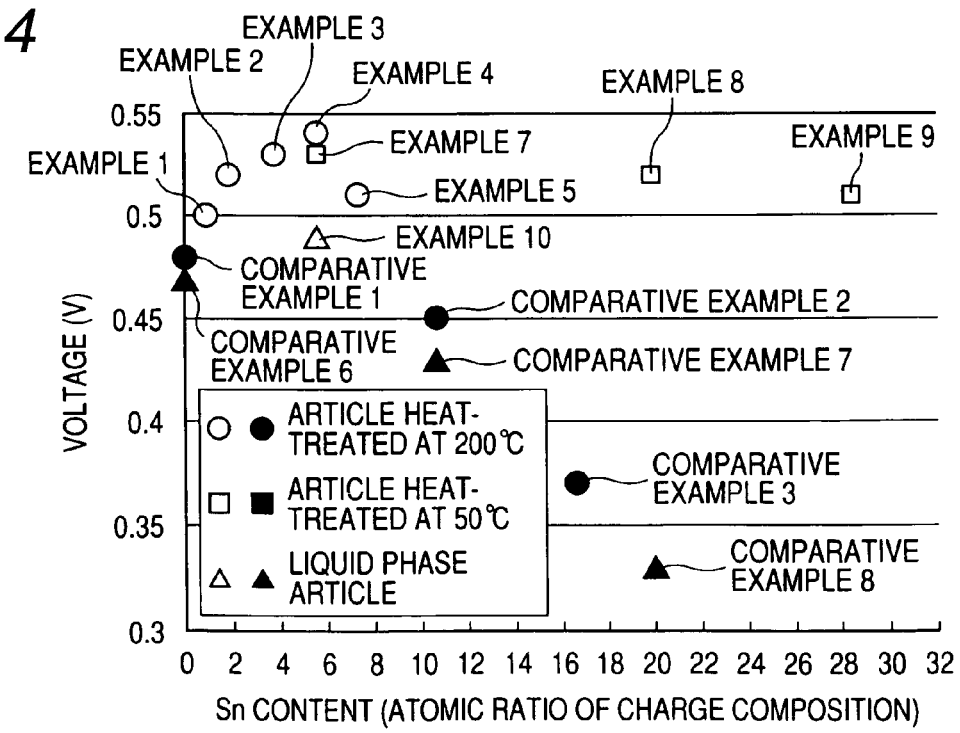
FIG. 4 is a graph showing the relation between the cell voltage and the Sn content (the atomic ratio of Sn in the charge composition (except the carrier and oxygen)).

The MEA and flow path plates were used to produce a single cell of a direct fuel supply. Air was supplied to the cathode electrode at a low flow rate of 160 ml/min while an aqueous solution of 1M methanol as fuel was supplied to the anode electrode at a flow rate of 0.6 ml/min, electric discharge was performed at current density of 150 mA/cm$^2$ in a state in which the cell was kept at 70° C. The voltage and resistance of the cell were measured after an hour. A result of the measurement was as shown in Table 1. FIG. 4 shows a relation between the cell voltage of the fuel cells using the catalysts produced in Examples and Comparative Examples (except Examples 6 and 11 and Comparative Examples 4 and 5) as a fuel electrodes and the amount of added Sn solution at the time of production of the catalysts.

Durability shown in Table was evaluated as follows. Electric discharge was performed at current density of 150 mA/cm$^2$ in a state in which the cell was kept at 70° C. The cell voltage was measured after 1000 hours. The reduction rate from the cell voltage after an hour was calculated. In Table 1, the case where the reduction rate was within 2% was evaluated as "A". The case where the reduction rate was from 2% to 4% was evaluated as "B". The case where the reduction rate was from 4% to 8% was evaluated as "C". The case where the reduction rate was larger than 8% was evaluated as "D".

It is apparent from results shown in Table 1 and FIG. 4 that the catalysts according to the invention has higher activity than that of the PtRu catalyst in comparison between Examples 1 to 5 and Comparative Example 1 and in comparison between Example 10 and Comparative Example 6, and that the synergic effect of Ru and Sn can be obtained in the catalysts according to the invention. In comparison between Examples 1 to 5 and Comparative Examples 2 and 3 and in comparison between Example 10 and Comparative Examples 7 and 8, it is apparent that the low Sn composition of the noble metal-containing particles is important for high output. In comparison between Example 4 and Comparative Examples 4 and 5, it is apparent that when the diameter of the fine particles is increased, performance is lowered so that the effect due to addition of Sn is almost eliminated. In comparison between Examples 7 to 9 and 1 to 5 and Comparative Examples 6 to 8, it is apparent that high performance can be obtained even in the case where the Sn content of the whole composition of the catalysts is high, if the process can be controlled to produce noble metal-containing particles of a low Sn content. It is apparent that the fuel cells using the catalysts has slightly high resistance but has excellent durability. In comparison between Example 6 and Comparative Example 1, it is apparent that performance can be improved to a certain degree when another noble metal-containing is added. Incidentally, in comparison between Example 11 and Example 1, it is apparent that the same degree of fuel cells performance can be obtained without supporting.

It is also confirmed that reformed gas type high-molecular electrolyte fuel cells using the catalysts according to the invention as anode catalysts has the aforementioned tendency. Accordingly, the catalysts according to the invention are more effective than the Pt—Ru or Pt—Ru—Sn catalysts according to the background art in terms of CO poisoning.

What is claimed is:

1. A catalyst comprising:
    oxygen and at least one noble metal-containing particle wherein said at least one noble metal-containing particle has a composition represented by a formula $Pt_X Ru_Y A_Z Sn_S$ and has a mean particle diameter of from 0.5 nm to 10 nm, wherein
    A is at least one element selected from the group consisting of Rh, Au, Pd, Ir and Os, and
    X, Y, Z and S are atomic ratios satisfying relations $30 \leq X \leq 70$, $30 \leq Y \leq 70$, $0 \leq Z \leq 40$, $0.5 \leq S \leq 8$ and $X+Y+Z+S=100$.

2. The catalyst according to claim 1, further comprising a carrier material, the carrier material supporting the at least one noble metal-containing particle.

3. The catalyst according to claim 2, further comprising at least one tin oxide particle, the at least one tin oxide particle being supported by the carrier material.

4. A catalyst comprising:
    oxygen and at least one noble metal-containing particle wherein said at least one noble metal-containing particle has a composition represented by a formula $Pt_X Ru_Y A_Z Sn_S$ and has a mean particle diameter of from 0.5 nm to 10 nm, wherein
    A is at least one element selected from a group consisting of Rh, Au, Pd, Ir and Os, and
    X, Y, Z and S are atomic ratios satisfying relations $30 \leq X \leq 70$, $30 \leq Y \leq 70$, $0 \leq Z \leq 40$, $0.5 \leq S \leq 8$ and $X+Y+Z+S=100$; and
    the catalyst further comprises at least one tin oxide particle such that a portion of the catalyst comprising both the at least one noble metal-containing particle and the at least one tin oxide particle has a composition represented by a formula $Pt_{x'} Ru_{y'} A'_{z'} Sn_{s'}$, wherein
    A' is at least one element selected from the group consisting of Rh, Au, Pd, Ir and Os, and
    x', y', z' and s' are atomic ratios satisfying relations $20 \leq x' \leq 42$, $20 \leq y' \leq 40$, $0 \leq z' \leq 30$, $0.8 \leq s' \leq 20$ and $x'+y'+z'+s'=100$.

5. A fuel electrode comprising:
    at least one catalyst according to claim 1.

6. A fuel cell, comprising:
    the fuel electrode according to claim 5;
    an oxidant electrode; and
    an electrolytic membrane disposed between the fuel electrode and the oxidant electrode.

7. The catalyst according to claim 4, wherein the X-ray diffraction pattern of the composition of the portion of the catalyst comprising both the at least one noble metal-containing particle and the at least one tin oxide particle exhibits a first peak indicating crystalline plane spacing of from 0.216 nm to 0.225 nm, and a second peak indicating crystalline plane spacing of from 0.255 nm to 0.268 nm, a ratio of an area of the second peak to an area of the first peak being from 3% to 20%.

8. The catalyst according to claim 1, wherein the catalyst further comprises at least one tin oxide particle and the atomic ratio of the amount of Sn present in a portion of the catalyst comprising the at least one noble metal-containing particle and the at least one tin oxide particle, exclusive of oxygen, is from 0.8 to 20 atm%.

9. The catalyst according to claim 1, wherein the catalyst satisfies $0<Z \leq 40$.

\* \* \* \* \*